United States Patent [19]

Kanbayashi et al.

[11] Patent Number: 6,083,311
[45] Date of Patent: Jul. 4, 2000

[54] WATER BASED INK HAVING METALLIC LUSTER ADAPTED FOR DIRECT-FILLING IN BALL-POINT PEN

[75] Inventors: Hironobu Kanbayashi; Teruaki Fukasawa, both of Gunma, Japan

[73] Assignee: Kabushiki Kaisha Pilot, Tokyo, Japan

[21] Appl. No.: 09/180,568

[22] PCT Filed: Feb. 18, 1998

[86] PCT No.: PCT/JP98/00676

§ 371 Date: Nov. 10, 1998

§ 102(e) Date: Nov. 10, 1998

[87] PCT Pub. No.: WO98/40441

PCT Pub. Date: Sep. 17, 1998

[30] Foreign Application Priority Data

Mar. 11, 1997 [JP] Japan .................................. 9-074613
Mar. 26, 1997 [JP] Japan .................................. 9-091563

[51] Int. Cl.[7] .................................................. C09D 11/18
[52] U.S. Cl. ...................... 106/31.65; 106/31.68; 106/31.7; 106/31.86; 106/31.95
[58] Field of Search .......................... 106/31.6, 31.65, 106/31.68, 31.86, 31.7, 31.95

[56] References Cited

U.S. PATENT DOCUMENTS 5,474,603  12/1995  Miyashita et al. ...................... 106/31.7
5,944,886  8/1999   Hashizume .............................. 106/404

FOREIGN PATENT DOCUMENTS 2-142865  5/1990  Japan .
7-145339  6/1995  Japan .
8-48929   2/1996  Japan .
8-209055  8/1996  Japan .

*Primary Examiner*—Helene Klemanski
*Attorney, Agent, or Firm*—Sughrue, Mion, Zinn Macpeak & Seas, PLLC

[57] ABSTRACT

Disclosed is water based ink having metallic luster adapted for a direct-filling ball-point pen, which is used by being directly filled into the tube, said ink comprising, based on the total amount of the ink composition, 1% to 20% by weight of a metallic color pigment comprising metallic powder and a color pigment adsorbed thereon, 0.1% to 1.0% by weight of a water-soluble or water-dispersible polymer agent which imparts pseudo-plasticity, and water, thereby providing ink satisfactory in beauty and luster and excellent in aging stability and writing properties.

6 Claims, No Drawings

WATER BASED INK HAVING METALLIC LUSTER ADAPTED FOR DIRECT-FILLING IN BALL-POINT PEN

TECHNICAL FIELD

The present invention relates to water based ink having a metallic luster adapted for a direct-filling ball-point pen, which is used by being directly filled into the tube.

BACKGROUND ART

Ink having a metallic luster has already been disclosed in JP-A-61-123684 (the term "JP-A" as used herein means an "unexamined published Japanese patent application"), JP-A-63-95277 and JP-A-4-126782. However, the ink described therein has too low viscosity to prevent the sedimentation of metallic powder having high specific gravity. On the other hand, JP-A-7-145339 discloses "metallic lustrous aqueous ink for a ball-point pen" which can be used by being directly filled into a refill, wherein pseudo-plasticity is imparted to the metallic-lustrous water based ink comprising aluminum powder to prevent the sedimentation of the aluminum powder. However, only the use of aluminum powder and further a color pigment as a complementary coloring agent results in lack of the beauty and luster of the ink. Furthermore, when the aluminum powder is used in the water based ink, a surface thereof is often treated with a petroleum solvent or a higher fatty acid to inhibit reaction with water. However, such a surface condition can not necessarily prevent the reaction completely, leading to deterioration of aging stability.

Further, JP-A-2-142865 discloses bright ink using primary metallic color pigments in which color pigments are chemically adsorbed on the surfaces of metallic pigments (metallic powder) through carboxylic acids each having at least one double bond and two carboxyl groups obtained by thermal polymerization of one or more kinds of double bond-containing carboxylic acids, or secondary metallic color pigments in which the above-mentioned primary metallic color pigments are further covered with polymers of radically polymerizable unsaturated carboxylic acids and monomers each containing three or more radical-polymerizable double bonds.

The present inventors purchased the above-mentioned metallic color pigment (trade name: FRIENDCOLOR) in which a color pigment was chemically adsorbed on a metallic pigment (metallic powder), from Showa Alumipowder Co. Ltd., and examined it in accordance with the procedure of the examples described in the above publication. As a result, it was found that the above-mentioned bright ink was excellent in beauty and luster, as compared with the conventional ink for a writing tool having a metallic luster, in which dyes or pigments are mixed with aluminum powder.

In the above-mentioned publication, ink for a marking pen is disclosed as Example 2, water based ink for a pen as Example 4 and ink for lettering as Example 5. However, the ink described above is ink for writing tools having control members utilizing capillary structures for controlling the outflow of ink from nibs, for example, nibs formed of fiber bundles for the above marking pen or pen wicks arranged between nibs and ink storage tubes for the other pens. Accordingly, it can not be used as direct-filling ink as it is.

There have hitherto been no satisfactory water based ink having a metallic luster adapted for direct-filling in a ball-point pen, which is excellent in beauty and luster and has aging stability.

An object of the present invention is to provide water based ink for a ball-point pen excellent in beauty and luster, having good writing properties, and useful as direct-filling ink, using the above-mentioned metallic color pigment in which the color pigment is adsorbed on the metallic powder.

DISCLOSURE OF INVENTION

As a result of extensive studies for attaining the above-mentioned object, the present inventors have discovered that a metallic color pigment is prevented from being sedimented and good writing properties can be obtained, even when ink is directly filled into the tube, by preventing the reaction of water with metallic powder, and further by imparting pseudo-plasticity to the ink so as to increase the viscosity of the ink high in the tube of a ball-point pen (in a stationary state) and lower the viscosity of the ink upon writing by shearing due to rotation of a ball, thus accomplishing the present invention.

That is to say, the object of the present invention has been achieved by providing water based ink having a metallic luster adapted for a direct-filling ball-point pen, which comprises, based on the total amount of the ink composition, 1% to 20% by weight of a metallic color pigment comprising metallic powder and a color pigment adsorbed thereon, 0.1% to 1.0% by weight of a water-soluble or water-dispersible polymer agent which imparts pseudo-plasticity, and water.

In addition, the ink composition of the present invention preferably contains a moisture-retaining wetting agent, a dispersant and a rust proof lubricant.

The above-mentioned metallic color pigment is characterized by that since the color pigment is allowed to be adsorbed on the metallic powder, the color pigment to be adsorbed can be selected from a wide variety of color pigments, so that wide color tones can be obtained with a strong metallic luster. In addition, since the surface of the metallic powder is covered with the color pigment, the reaction of water with the metallic powder is inhibited.

BEST MODE FOR CARRYING OUT THE INVENTION

The present invention provides water based ink having a metallic luster adapted for a direct-filling ball-point pen, which comprises, based on the total amount of the ink composition, 1% to 20% by weight of a metallic color pigment comprising metallic powder and a color pigment adsorbed thereon, 0.1% to 1.0% by weight of a water-soluble or water-dispersible polymer agent which imparts pseudo-plasticity, and water. In addition to the above described components, 10% to 40% by weight of a moisture-retaining wetting agent, 1% to 8% by weight of a dispersant, and 0.2% to 2% by weight of a rust proof lubricant are preferably incorporated. Furthermore, a pH adjustor and/or a bacteriostat may be added as needed, and an organic pigment may also be added as a colorant. The water based ink having a metallic luster adapted for a direct-filling ball-point pen of the present invention is not limited to ink having the ink composition described above.

The content of the metallic color pigment is from 1% to 20% by weight based on the total amount of the ink composition. The reason for this is as follows. Contents of less than 1% by weight do not provide metallic appearance at all in a calligraphic specimen after written, whereas contents of exceeding 20% by weight may deteriorate the aging stability of the ink to cause the sedimentation of the metallic color pigment, thereby clogging a nib with the ink, which makes writing impossible in some cases.

The metallic color pigments can be produced, for example, by stirring carboxylic acid polymers (hereinafter referred to as thermally polymerized carboxylic acids) having at least one double bond and two carboxyl groups, which is obtained by thermal polymerization of one or more kinds of double bond-containing carboxylic acids, and metallic pigments in organic solvents, mixing cakes obtained therefrom by filtration with color pigments in the presence of organic solvents by kneading or stirring, and then, removing the excessive organic solvents, as described in JP-A-2-142865. Alternatively, the metallic color pigments can be produced by stirring the thermally polymerized carboxylic acids and color pigments in organic solvents, mixing cakes obtained therefrom by filtration with color pigments by kneading or stirring in the presence of organic solvents, further adding thereto monomers each containing three or more radical-polymerizable double bonds and polymerization initiators, while dispersing the resulting mixtures by stirring in the organic solvents, and removing the excess organic solvents. Any of organic and inorganic pigments can be used as the color pigments, as long as they are not dissolved in organic solvents used. However, the color pigments are required to be stably adsorbed on the metallic pigments on which thermally polymerized carboxylic acid adsorption treatment has been conducted. Specific examples of the organic pigments include azo lake pigments, insoluble azo pigments, condensed azo pigments, phthalocyanine pigments, indanthrene pigments, indigo pigments, perinone pigments, perylene pigments, phthalone pigments, dioxazine pigments, quinacridone pigments, isoindolinone pigments and metal complex pigments. The inorganic pigments include chrome yellow, yellow iron oxide, red iron oxide, cobalt blue, carbon black and titanium oxide. Preferred examples of the metallic color pigments include one (trade name: FRIENDCOLOR) sold by Showa Alumipowder Co., Ltd.

The water-soluble or water-dispersible polymer agents which imparts pseudo-plasticity include natural polysaccharides such as guar gum and xanthan gum, and synthetic polymers such as crosslinking type acrylic acid polymers. In general, the natural polysaccharides more easily sediment metallic color pigments rather than the synthetic polymers, because the yield values of the natural polysaccharides are lower than those of the synthetic polymers. If the amount of polysaccharides added is increased for inhibiting the sedimentation, ink solidifies at a nib due to the film-forming properties associated with water evaporation, to thereby tend to cause poor starting to write,. The synthetic polymers are therefore preferred, and particularly, the crosslinking type acrylic acid polymers are most suitable.

The content of the water-soluble or water-dispersible polymer agent which imparts pseudo-plasticity is from 0.1% to 1.0% by weight based on the total amount of the ink composition. The reason for this is as follows. Contents of less that 0.1% by weight fail to give a yield value sufficient as ink, which leads to the sedimentation of the metallic color pigment, whereas contents of exceeding 1.0% by weight result in too high an ink viscosity and yield value to cause deterioration of writing performances such as writing feeling and ink output, although the sedimentation of the metallic color pigment can be prevented.

As the crosslinking type acrylic acid polymer, those having a number average molecular weight of 3,000,000 to 5,000,000 are suitable. This is because it can produce ink having excellent aging stability and a high yield value when the ink is prepared therewith. A low yield value results in fluidization of the ink even by application of low shearing stress, which causes the sedimentation of the metallic color pigment. A high yield value can prevent the metallic color pigment from being sedimented, because the ink is not fluidized unless stress exceeding the yield value is applied. When the molecular weight is less than 3,000,000, the yield value of the ink is decreased by metallic ions dissociated with time to cause the sedimentation of the metallic color pigment. On the other hand, when the molecular weight is greater than 5,000,000, the crosslinking type acrylic acid polymer can not uniformly dispersed into the ink to deteriorate the aging stability of the ink.

In order to prevent the ink from drying up at a nib, it is preferred that the ink for a ball-point pen containing a water based ink composition further contains a moisture-retaining wetting agent. When the moisture-retaining wetting agent is contained in the ink in an amount of less than 10% by weight based on the total amount of the ink composition, the sufficient performance against drying up of the ink can not be obtained. On the other hand, exceeding 40% by weight results in failure to obtain a sufficient yield value, so that the metallic color pigment might not be fully prevented from being sedimented. It is therefore suitable that the moisture-retaining wetting agent is contained in an amount of 10% to 40% by weight.

The moisture-retaining wetting agent for use in the present invention includes water-soluble organic solvents such as ethylene glycol, propylene glycol, glycerin, diethylene glycol, triethylene glycol, dipropylene glycol, thiodiglycol, polyglycerin, polyethylene glycol, polypropylene glycol, methyl cellosolve, butyl cellosolve, methyl carbitol and ethyl carbitol. They can be used alone or as a mixture of two or more kinds thereof.

In addition, it is preferred that a dispersant is added to the ink, in order to improve aging stability of the ink, particularly, dispersion stability of the metallic color pigment. When the dispersant is contained in an amount of less than 1% by weight based on the total amount of the ink composition, uniform dispersion can not be attained. Exceeding 8% by weight might bring about a decrease in the yield value of the ink. It is therefore suitable that the dispersant is contained in an amount of 1% to 8% by weight.

Polymer dispersants and nonionic surfactants can be used as the dispersants. Specifically, examples thereof include styrene/acrylic acid copolymers, styrene/acrylic acid/alkyl methacrylate copolymers, polyoxyethylene nonylphenyl ether and polyoxyethylene lauryl ether.

Further, the ink of the present invention is for a ball-point pen containing a water based ink composition, so that a lubricant is preferably added to improve rotation of a ball. A so-called rust proof lubricant having rust preventive action is most suitable because a chip of a ball-point pen is made of a metal such as stainless steel or chrome yellow. When the content of the lubricant is less than 0.2% by weight based on the total amount of the ink composition, the lubricity becomes insufficient, resulting in a tendency to cause poor writing feeling and a poor calligraphic specimen. On the other hand, contents of exceeding 2% by weight might cause a decrease in the yield value of the ink. It is therefore suitable that the rust proof lubricant is contained in an amount of 0.2% to 2% by weight.

The rust proof lubricant for use in the present invention includes phosphoric ester surfactants, benzotriazole, fatty acids and fatty acid esters. These rust proof lubricants may also be used as a mixture of two or more kinds thereof.

Furthermore, taking into account stability of the ink, a pH adjustor is preferably used to adjust the pH of the ink to the range of from 6 to 8. When the pH is lower than 6, not only it is difficult to uniformly dissolve and disperse the polymer agent which imparts pseudo-plasticity, resulting in no formation of the ink having good aging stability, but also there is a tendency to hinder the action of the rust proof lubricant contained in the ink, leading to difficulty in obtaining good writing performances. On the other hand, a pH exceeding 8 results in enhancement of the reactivity of aluminum or the like which is a basic material of the metallic color pigment, so that it becomes difficult to control the reaction thereof with water or with the polymer agent which imparts pseudo-plasticity, making it hard to obtain ink having good aging stability, which might deteriorate the fluidity of the ink. The pH adjustors which can be used herein include monoethanolamine, diethanolamine, triethanolamine, N,N-dimethylethanolamine, N,N-diethanolamine, N,N-dibutylethanol-amine and N,N-methyldiethanolamine.

Further, addition of a bacteriostat is preferred because the proliferation of bacteria is prevented and the aging stability of the ink is improved. The bacteriostat for use in the present invention includes 1,2-benzoisothiazolin-3-one, sodium benzoate and sodium dehydroacetate.

Furthermore, mixing of an organic pigment as a complementary coloring agent can provide a variety of color tones. When it is contained in an amount of less than 1% by weight based on the total amount of the ink composition, toning cannot be achieved well. On the other hand, when it is contained in an amount exceeding 15% by weight, solidification of the ink by drying at a nib proceeds to cause a fear of significantly deteriorating the starting-to-write performance. It is therefore preferred that the complementary coloring agent is contained in an amount of 1% to 15% by weight. The complementary coloring organic pigments for use in the present invention include Pigment Yellow 1, 3, 12, 93, 94 and 109, Pigment Blue 15, 16 and 17, Pigment Red 3, 5, 122, 149 and 202, and Pigment Green 7 and 36.

EXAMPLES

The present invention will be further illustrated in greater detail with reference to the following examples and comparative examples, which are, however, not to be construed as limiting the invention.

Example 1

One percent by weight of a metallic color pigment (trade name: FRIENDCOLOR F500 RG) which has an average particle size of 17 μm and a red-golden color tone, sold by Showa Alumipowder Co. Ltd., as a metallic color pigment, 20.0% by weight of ethylene glycol as a moisture-retaining wetting agent, 3.0% by weight of a styrene/acrylic acid/alkyl methacrylate copolymer as a dispersant, 1.0% by weight of a phosphoric ester surfactant as a rust proof lubricant, 0.2% by weight of 1,2-benzoisothiazolin-3-one as a bacteriostat, 1.0% by weight of triethanolamine as a pH adjustor, and 73.4% by weight of ion-exchanged water were mixed by means of a magnetic stirrer at 60° C. for 1 hour.

Subsequently, 0.4% by weight of a crosslinking type acrylic acid polymer having a number average molecular weight of 3,000,000 (hereinafter briefly referred to as "crosslinking type acrylic acid polymer B") was added to the resulting liquid as a water-dispersible polymer agent which imparts pseudo-plasticity, and the resulting mixture was stirred with a homogenizer to uniformly disperse crosslinking type acrylic acid polymer B, thereby preparing water based ink having a red-golden metallic luster for a direct-filling ball-point pen of this example. The pH of this ink was 7.

Examples 2 to 10

Water based ink having a red-golden metallic luster for a direct-filling ball-point pen was prepared according to the same procedure as in Example 1, except that the ink compositions were changed as shown in Tables 1 and 2. The pH of each ink was 7. The numerals described in the tables indicate the contents (% by weight) of the respective components in the ink compositions.

Note 1. Crosslinking type acrylic acid polymer C used in Example 5 has a number average molecular weight of 5,000,000.

Note 2. Crosslinking type acrylic acid polymer A used in Example 6 has a number average molecular weight of 2,000,000.

Note 3. Crosslinking type acrylic acid polymer D used in Example 7 has a number average molecular weight of 6,500,000.

Note 4. In Example 8, xanthane gum was used in place of the crosslinking type acrylic acid polymer.

Examples 11 to 14

Water based ink having a metallic luster for a direct-filling ball-point pen was prepared according to the same procedure as in Example 1, except that organic pigments were added as complementary coloring agents, and that the ink compositions were changed as shown in Table 2. The pH of each ink was 7.

Note 1. In Example 11, Pigment Yellow 3 was added as a complementary coloring agent.

Note 2. In Example 12, FRIENDCOLOR F500 RG was replaced by a metallic color pigment (trade name: FRIENDCOLOR F500 OR) which has an average particle size of 17 μm and an orange color tone, and Pigment Yellow 3 and Pigment Red 3 were added as complementary coloring agents.

Note 3. In Example 13, FRIENDCOLOR F500 RG was replaced by a metallic color pigment (trade name: FRIENDCOLOR F500 GR) which has an average particle size of 17 μm and a green color tone, and Pigment Yellow 3 and Pigment Blue 15 were added as complementary coloring agents.

Note 4. In Example 14, FRIENDCOLOR F500 RG was replaced by a metallic color pigment (trade name: FRIENDCOLOR F500 BL) which has an average particle size of 17 μm and a blue color tone, and Pigment Blue 15 was added as a complementary coloring agent.

Comparative Examples 1 and 2

Water based ink having a red-golden metallic luster for a direct-filling ball-point pen was prepared according to the same procedure as in Example 1, except that FRIENDCOLOR F500 RG was used as a metallic color pigment, and that the ink compositions were changed as shown in Table 3. The pH of each ink was 7.

Comparative Example 3

Water based ink having a silvery metallic luster for a direct-filling ball-point pen was prepared according to the same procedure as in Example 1, except that aluminum powder was used in place of the metallic color pigment, and that the ink composition was changed as shown in Table 3. The pH of the ink was 7.

Comparative Examples 4 to 6

Water based ink having a red-golden metallic luster for a direct-filling ball-point pen was prepared using FRIEND- COLOR F500 RG as a metallic color pigment similar to Example 1, according to the same procedure as in Example 1, except that the ink compositions were changed as shown in Table 3. The pH of each ink was 7.

Note 1. In Comparative Example 4, xanthan gum was used in place of crosslinking type acrylic acid polymer B.

Tests and Evaluations

For the respective water based ink having metallic luster for a direct-filling ball-point pen of Examples 1 to 14 and Comparative Examples 1 to 6, the following tests and evaluation were carried out.

Sedimentation Test of Metallic Color Pigment

Ink (100 cc) was sampled, and centrifuged with applying an acceleration (G: the unit of gravitational acceleration) for 10 minutes, followed by observation of the state of the ink.

(Evaluation)

The metallic color pigment was separated and sedimented at 300 G or less . . . (x)

The metallic color pigment was separated and sedimented at between 300 to 400 G . . . (Δ)

The metallic color pigment was separated and sedimented at between 400 to 600 G . . . (○)

No metallic color pigment was separated and sedimented even at 600 G or more . . . (◎)

Evaluation of Aging Stability of Ink

Ink was placed in a closed glass vessel under circumstances of 50° C. and 0% RH, and allowed to stand. Then, the ink was evaluated in terms of viscosity change thereof and by observation under a microscope.

(Evaluation)

A precipitate was developed in the ink, or the viscosity change of the ink as compared with the initial viscosity reached 30% or more, within 1 month . . . (x)

A precipitate was developed in the ink, or the viscosity change of the ink as compared with the initial viscosity reached 30% or more, within a period of from 1 to 2 months . . . (Δ)

A precipitate was developed in the ink, or the viscosity change of the ink as compared with the initial viscosity reached 30% or more, within a period of from 2 to 3 months . . . (○)

No precipitate was developed in the ink, and the viscosity change of the ink as compared with the initial viscosity was 30% or less, over 3 months or more . . . (◎)

Then, a refill with a ball-point pen chip having a ball diameter of 0.7 mm of a commercially available ink ball-point pen for containing a water based gel ink composition (manufactured by The Pilot Corp., trade name: G-1) was filled with each ink to prepare a ball-point pen, which was tested and evaluated as follows.

Test of Starting-to-Write Performance

The ball-point pen uncapped was laid down and allowed to stand under circumstances of 50° C. and 30% RH for 1 month. After making the temperature back to room temperature, a straight line was drawn with it to visually evaluate the state of the calligraphic specimen.

(Evaluation)

It was impossible to start to write a line even after drawing of the pen over 10 cm or longer from the start . . . (x)

It was possible to start to write a line within a drawing of from 5 to 10 cm from the start without occurrence of a scratchy or a broken line in the calligraphic specimen . . . (Δ)

It was possible to start to write a line within a drawing of from 3 to 5 cm from the start without occurrence of a scratchy or a broken line in calligraphic specimen . . . (○)

It was possible to start to write a line within a drawing of from 3 cm or less from the start without occurrence of a scratchy or a broken line in calligraphic specimen . . . (◎)

Writing Performance Test

Writing by hand was practically performed to visually evaluate the state of the calligraphic specimen.

(Evaluation)

A blurring or a scratchy was observed in the calligraphic specimen, so that the ink could not be put to practical use . . . (x)

A blurring or a scratchy was observed in the calligraphic specimen, and the ink was somewhat inferior in practical use . . . (Δ)

A blurring or a scratchy was slightly observed in the calligraphic specimen, but the ink could be practically used . . . (○)

No blurring or no scratchy was observed in the calligraphic specimen, and satisfactory calligraphic specimen was shown . . . (◎)

The results of the evaluation in Examples and Comparative Examples are as shown in Tables 1, 2, and 3.

TABLE 1

|  | Example | | | | | | |
| --- | --- | --- | --- | --- | --- | --- | --- |
|  | 1 | 2 | 3 | 4 | 5 | 6 | 7 |
| FRIENDCOLOR F500 RG | 1.0 | 20.0 | 15.0 | 15.0 | 10.0 | 15.0 | 5.0 |
| FRIENDCOLOR F500 GR |  |  |  |  |  |  |  |
| FRIENDCOLOR F500 OR |  |  |  |  |  |  |  |
| FRIENDCOLOR F500 BL |  |  |  |  |  |  |  |
| Pigment Yellow 3 |  |  |  |  |  |  |  |
| Pigment Blue 15 |  |  |  |  |  |  |  |
| Pigment Red 3 |  |  |  |  |  |  |  |
| Moisture-Retaining Wetting Agent | 20.0 | 20.0 | 10.0 | 40.0 | 30.0 | 20.0 | 10.0 |
| Dispersant | 3.0 | 1.0 | 8.0 | 3.0 | 5.0 | 3.0 | 2.0 |
| Rust Proof Lubricant | 1.0 | 2.0 | 1.0 | 0.5 | 0.2 | 1.0 | 1.5 |
| Bacteriostat | 0.2 | 0.2 | 0.2 | 0.2 | 0.2 | 0.2 | 0.2 |
| pH Adjustor | 1.0 | 1.0 | 1.0 | 1.0 | 1.0 | 1.0 | 1.0 |
| Ion-Exchanged Water | 73.4 | 55.3 | 64.4 | 40.2 | 53.2 | 59.0 | 80.0 |
| Crosslinking Acrylic Acid Polymer A |  |  |  |  |  | 0.8 |  |
| Crosslinking Acrylic Acid Polymer B | 0.4 | 0.5 | 0.4 | 0.1 |  |  |  |
| Crosslinking Acrylic Acid Polymer C |  |  |  |  | 0.4 |  |  |
| Crosslinking Acrylic Acid Polymer D |  |  |  |  |  |  | 0.3 |
| Xanthan Gum |  |  |  |  |  |  |  |
| Color Tone | Red-Gold | Red-Gold | Red-Gold | Red-Gold | Red-Gold | Red-Gold | Red-Gold |
| Sedimentation of Metallic Powder | ◎ | ○ | ◎ | ○ | ◎ | ○ | ◎ |
| Aging Stability of Ink | ◎ | ○ | ○ | ○ | ◎ | ○ | ○ |
| Starting-to-Write Performance | ◎ | ○ | ○ | ○ | ◎ | ○ | ○ |
| Writing Performance | ○ | ○ | ○ | ○ | ○ | ○ | ○ |

TABLE 2

| | Example | | | | | | |
|---|---|---|---|---|---|---|---|
| | 8 | 9 | 10 | 11 | 12 | 13 | 14 |
| FRIENDCOLOR F500 RG | 15.0 | 15.0 | 10.0 | 15.0 | | | |
| FRIENDCOLOR F500 GR | | | | | | 15.0 | |
| FRIENDCOLOR F500 OR | | | | | 15.0 | | |
| FRIENDCOLOR F500 BL | | | | | | | 15.0 |
| Pigment Yellow 3 | | | | 10.0 | 9.0 | 4.0 | |
| Pigment Blue 15 | | | | | | 4.0 | 8.0 |
| Pigment Red 3 | | | | | 1.0 | | |
| Moisture-Retaining Wetting Agent | 25.0 | 20.0 | 10.0 | 40.0 | 20.0 | 20.0 | 20.0 |
| Dispersant | 6.0 | 3.0 | 5.0 | 3.0 | 3.0 | 3.0 | 3.0 |
| Rust Proof Lubricant | 1.0 | 1.0 | 1.5 | 1.0 | 1.0 | 1.0 | 1.0 |
| Bacteriostat | 0.2 | 0.2 | 0.2 | 0.2 | 0.2 | 0.2 | 0.2 |
| pH Adjustor | 1.0 | 1.0 | 1.0 | 1.0 | 1.0 | 1.0 | 1.0 |
| Ion-Exchanged Water | 51.2 | 59.7 | 71.3 | 29.4 | 49.4 | 51.4 | 51.4 |
| Crosslinking Acrylic Acid Polymer A | | | | | | | |
| Crosslinking Acrylic Acid Polymer B | | 0.1 | 1.0 | 0.4 | 0.4 | 0.4 | 0.4 |
| Crosslinking Acrylic Acid Polymer C | | | | | | | |
| Crosslinking Acrylic Acid Polymer D | | | | | | | |
| Xanthan Gum | 0.6 | | | | | | |
| Color Tone | Red-Gold | Red-Gold | Red-Gold | Red-Gold | Orange | Green | Blue |
| Sedimentation of Metallic Powder | ○ | ○ | ⊚ | ⊚ | ⊚ | ⊚ | ⊚ |
| Aging Stability of Ink | ○ | ○ | ○ | ⊚ | ⊚ | ⊚ | ⊚ |
| Starting-to-Write Performance | ○ | ○ | ○ | ⊚ | ⊚ | ⊚ | ⊚ |
| Writing Performance | ○ | ○ | ○ | ○ | ○ | ○ | ○ |

TABLE 3

| | Comparative Example | | | | | |
|---|---|---|---|---|---|---|
| | 1 | 2 | 3 | 4 | 5 | 6 |
| FRIENDCOLOR F500 RG | 0.5 | 25.0 | | 15.0 | 15.0 | 15.0 |
| Aluminum Powder | | | 15.0 | | | |
| Moisture-Retaining Wetting Agent | 20.0 | 20.0 | 20.0 | 20.0 | 20.0 | 20.0 |
| Dispersant | 3.0 | 3.0 | 3.0 | 3.0 | 3.0 | 3.0 |
| Rust Proof Lubricant | 1.0 | 1.0 | 1.0 | 1.0 | 1.0 | 1.0 |
| Bacteriostat | 0.2 | 0.2 | 0.2 | 0.2 | 0.2 | 0.2 |
| pH adjustor | 1.0 | 1.0 | 1.0 | 1.0 | 1.0 | 1.0 |
| Ion-Exchanged Water | 73.9 | 49.4 | 59.4 | 58.3 | 59.75 | 58.3 |
| Crosslinking Acrylic Acid Polymer A | | | | | | |
| Crosslinking Acrylic Acid Polymer B | 0.4 | 0.4 | 0.4 | | 0.05 | 1.5 |
| Crosslinking Acrylic Acid Polymer C | | | | | | |
| Crosslinking Acrylic Acid Polymer D | | | | | | |
| Xanthan Gum | | | | 1.5 | | |
| Color Tone | Red-Gold | Red-Gold | Silver | Red-Gold | Red-Gold | Red-Gold |
| Sedimentation of Metallic Powder | ⊚ | x | Δ | Δ | x | ⊚ |
| Aging Stability of Ink | x | x | x | x | x | Δ |
| Starting-to-Write Performance | x | x | x | x | x | x |
| Writing Performance | x | x | Δ | x | x | x |

In Comparative Example 1, the metallic color pigment was added in a small amount, so that the sedimentation did not occur. However, the calligraphic specimen was faint, the metallic luster was insufficient, and the characteristics of the crosslinking type acrylic acid polymer strongly appeared to significantly exhibit a blur and a broken line.

In Comparative Example 2, the addition of a large amount of the metallic color pigment resulted in failure to support the metallic color pigment by the yield value of the ink, which caused the sedimentation. As a result, the nib was clogged with the ink to make writing impossible.

Comparative Example 3 is an example in which aluminum powder was adopted as a colorant in place of the metallic color pigment. The reaction of a surface of aluminum with water or the reaction of liberated aluminum ions with terminal groups of the polymer agent which imparts pseudo-plasticity proceeded, resulting in failure to realize ink having aging stability. In addition, the use of aluminum powder resulted in inferior beauty and luster of the ink as compared with the use of the metallic color pigment, so that the desired writing performance was not obtained.

In Comparative Example 4, the addition of xanthan gum in a large amount of 1.5% by weight brought about poor dissolution and dispersibility thereof in the ink, not only failing to provide aging stability, but also leading to lack of the fluidity of the ink. Accordingly, satisfactory writing performance was not obtained.

In Comparative Example 5, the crosslinking type acrylic acid polymer was added in a small amount, so that a yield value sufficient for ink was not obtained. The metallic color pigment was therefore sedimented to cause ink clogging at the nib, which made writing impossible.

In Comparative Example 6, the addition of a large amount of the crosslinking type acrylic acid polymer resulted in too high viscosity and yield value of the ink, failing to obtain satisfactory writing performance, although the metallic color pigment was not sedimented.

Industrial Applicability

The water based ink having a metallic luster for a direct-filling ball-point pen of the present invention has the constitution as described above. Accordingly, there can be obtained ink which has strong metallic luster, easily provides a variety of color tones, and which is more excellent in aging stability and writing performance than those of conventional water based ink having a metallic luster for a direct-filling ball-point pen.

What is claimed is:

1. Water based ink having metallic luster adapted for a direct-filling ball-point pen, which comprises, based on the total amount of the ink composition, 1% to 20% by weight of a metallic color pigment comprising metallic powder and a color pigment adsorbed thereon, 0.1% to 1.0% by weight of a water-soluble or water-dispersible polymer agent which imparts pseudo-plasticity, 1% to 15% by weight of an organic pigment as a complementary coloring agent based on the total amount of the ink composition and water.

2. The ink according to claim 1, wherein the water-soluble or water-dispersible polymer agent is a crosslinking-type acrylic acid polymer having a number average molecular weight of 3,000,000 to 5,000,000.

3. The ink according to claim 1, further containing 10% to 40% by weight of a moisture-retaining wetting agent, 1% to 8% by weight of a dispersant, and 0.2% to 2% by weight of a rust proof lubricant, based on the total amount of the ink composition.

4. The ink according to claim 2, further containing 10% to 40% by weight of a moisture-retaining wetting agent, 1% to 8% by weight of a dispersant, and 0.2% to 2% by weight of a rust proof lubricant, based on the total amount of the ink composition.

5. The ink according to claim 3, further containing a pH adjustor and/or a bacteriostat.

6. The ink according to claim 4, further containing a pH adjustor and/or a bacteriostat.

* * * * *